(12) United States Patent  (10) Patent No.: US 8,185,289 B2
Tagawa  (45) Date of Patent: May 22, 2012

(54) VEHICLE DRIVING SUPPORT APPARATUS

(75) Inventor: Satoshi Tagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 527 days.

(21) Appl. No.: 12/457,926

(22) Filed: Jun. 25, 2009

(65) Prior Publication Data

US 2010/0004810 A1   Jan. 7, 2010

(30) Foreign Application Priority Data

Jul. 7, 2008 (JP) ................................. 2008-176993

(51) Int. Cl.
*B60R 21/00* (2006.01)
(52) U.S. Cl. ........................ 701/72; 701/409; 340/438
(58) Field of Classification Search .................. None
See application file for complete search history.

(56) References Cited

U.S. PATENT DOCUMENTS

| | | | |
|---|---|---|---|
| 6,907,778 B2 * | 6/2005 | Kogure et al. | 73/146 |
| 2004/0046648 A1 | 3/2004 | Matsuura | |
| 2006/0287817 A1 * | 12/2006 | Nagel | 701/209 |

FOREIGN PATENT DOCUMENTS

| | | |
|---|---|---|
| JP | A-03-053142 | 3/1991 |
| JP | A-06-0258090 | 9/1994 |
| JP | A-07-049239 | 2/1995 |
| JP | A-09-166209 | 6/1997 |
| JP | A-H-11-014379 | 1/1999 |
| JP | A-2003-269974 | 9/2003 |
| JP | A-2003-276472 | 9/2003 |
| JP | 2004-224227 * | 8/2004 |
| JP | A-2005-088613 | 4/2005 |
| JP | A-2005-119533 | 5/2005 |
| JP | A-2007-216839 | 8/2007 |

* cited by examiner

*Primary Examiner* — Michael J. Zanelli
(74) *Attorney, Agent, or Firm* — Posz Law Group, PLC

(57) ABSTRACT

A vehicle driving support apparatus includes: a tire type determination element determining a tire type of a vehicle; a memory storing a curvature threshold data showing a relationship between the tire type and a curvature threshold such that the curvature threshold is inversely related to a grip performance of the tire; a curve determination element determining based on a current position of the vehicle and a road data whether a curve is disposed on a road ahead of the vehicle; a curvature threshold determination element specifying the curvature threshold corresponding to the tire based on the tire type and the curvature threshold data; and a warning guidance performing element performing warning guidance when a curvature of the curve ahead of the vehicle is smaller than the curvature threshold corresponding to the tire.

8 Claims, 3 Drawing Sheets

VEHICLE DRIVING SUPPORT APPARATUS

CROSS REFERENCE TO RELATED APPLICATION

This application is based on Japanese Patent Application No. 2008-176993 filed on Jul. 7, 2008, the disclosure of which is incorporated herein by reference.

FIELD OF THE INVENTION

The present invention relates to a vehicle driving support apparatus.

BACKGROUND OF THE INVENTION

An information device for informing a warning to a driver of a vehicle is disclosed in JP-A-H11-14379. The device informs the warning with using an image or a sound when a vehicle speed exceeds an optimum speed. The optimum speed for entering into the curve is calculated based on curvature information of the curve stored in memory medium.

Another information device including an air pressure sensor, a determination unit and a navigation system is disclosed in JP-A-2005-119533. The air pressure sensor detects air pressure in a tire, which is mounted in a vehicle. The determination unit determines whether the tire pressure detected by the sensor is in a predetermined range. The navigation system searches a planning driving route from a current position to a destination. Based on the planning driving route, the device preliminarily estimates road conditions such a highway and a curve. The device informs a driver of the vehicle to pump the tire if necessary.

However, the devices disclosed in the above prior art inform the warning without considering a type of the tire. Accordingly, even when the tire has excellent tire grip performance, the device may inform the warning, which is the same as the warning in a case where the tire has low tire grip performance. Thus, the device does not inform the warning according to the type of the tire mounted in the vehicle.

SUMMARY OF THE INVENTION

In view of the above-described problem, it is an object of the present disclosure to provide a vehicle driving support apparatus.

According to an aspect of the present disclosure, a vehicle driving support apparatus includes: a tire type determination element for determining a type of a tire mounted on a vehicle; a memory for storing a curvature threshold data, which shows a relationship between the type of the tire and a curvature threshold in such a manner that the curvature threshold is inversely related to a grip performance of the tire; a curve determination element for determining based on a current position of the vehicle and a road data whether a curve is disposed on a road ahead of the vehicle; a curvature threshold determination element for specifying the curvature threshold corresponding to the tire of the vehicle based on the type of the tire and the curvature threshold data; and a warning guidance performing element for performing warning guidance when a curvature of the curve ahead of the vehicle is smaller than the curvature threshold corresponding to the tire.

In the above device, the warning guidance suitable for the tire type is performed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
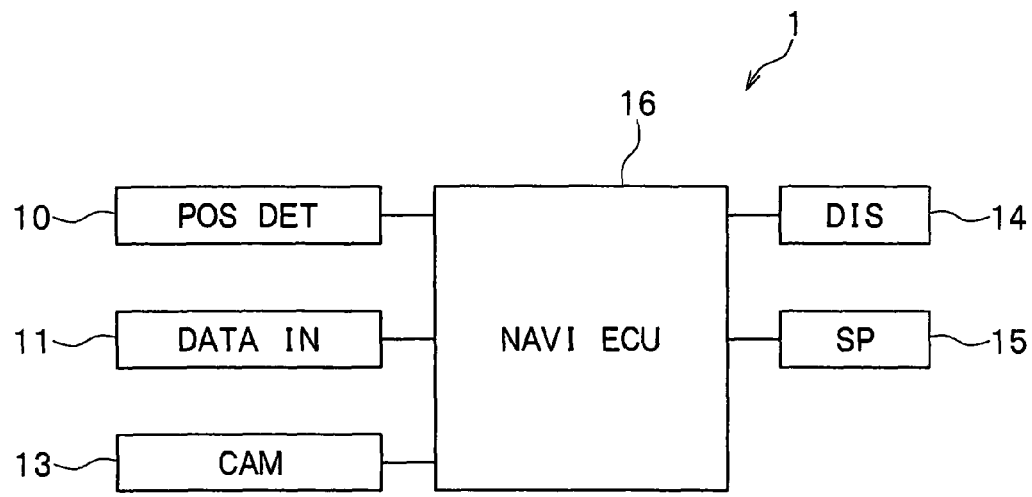
FIG. 1 is a diagram showing a vehicle driving support apparatus according to an example embodiment.

A vehicle driving support apparatus according to an example embodiment is shown in FIG. 1. The apparatus includes a navigation device 1.

The navigation device 1 includes a position detection unit 10, a map data input unit 11, a tire surface photographing device 13, a display 14, a speaker 15 and a navigation ECU 16.

The position detection unit 10 includes a geomagnetic sensor, a gyroscope, a distance sensor and a GPS receiver (not shown), which are well known devices. The unit 10 outputs a signal to the navigation ECU 16, the signal for specifying the current position and the driving direction of the vehicle based on results detected by these sensors.

The map data input unit 11 reads the map data from a memory medium for storing the map data, and inputs the map data to the navigation ECU 16. The map data includes road data representing information about a distance between two road links, a road type, the number of lanes, a position of a traffic signal and a curvature of a curve, map matching data for improving a position detection accuracy, a background data representing information about a position, a shape and a name of a river, a lake, a sea, a railroad and a facility, and facility data representing information about a name of a facility, a location of the facility and a category of the facility. The memory medium storing the map data is a CD, a DVD, a HDD or a memory card.

The tire surface photographing device 13 includes a camera and an image recognition processor (not shown). The camera shoots the tire surface. The processor performs an image recognition process so that the image shot by the camera is processed.

The processor includes a memory (not shown) memorizes tread patterns of various tires, which have different wear conditions. The tread pattern is a pattern of a groove on the surface of the tire. The processor compares the image of the groove pattern of the tire surface shot by the camera with the pattern of the groove on the tire surface memorized in the memory by the pattern matching method. Thus, the wearing condition of the tire surface shot by the camera is recognized, and then, the processor outputs the information about the tire wearing degree representing the degree of wearing to the navigation ECU 16. In this embodiment, the wearing degree is defined such that the wearing degree of a state almost equal to an unused tire is defined as 0%, the wearing degree of a state that the groove on the tire surface is worn almost half is defined as 50%, and the wearing degree of a state that the groove on the tire surface is not recognized is defined as 100%.

The image recognition processor determines based on the color tone of the tire surface whether the tire surface is dried or wet. The processor outputs the result to the navigation ECU 16.

The display 14 includes a display element such as a liquid crystal display. The display 14 displays the image according to the image signal input from the navigation ECU 16.

The speaker 15 outputs a voice message corresponding to the sound signal input from the navigation ECU 16.

The navigation ECU 16 includes a computer having a CPU, a ROM, a RAM, a flash memory, and an I/O element. The CPU executes various process according to a program stored in the ROM. The process to be executed by the navigation ECU 16 includes a current position determination process, a map display process, a destination search process, a route search process and a route guidance process. The current position determination process provides to specify the current position and the driving direction of the vehicle based on the signal input from the position detection unit 10. The map display process provides to display the current position mark of the vehicle overlapped on the map around the current position. The destination search process provides to search the destination according to the user operation. The route search process provides to search the guiding route from the starting point to the destination. The route guidance process provides to guide the route according to the guiding route.

Figure 2:
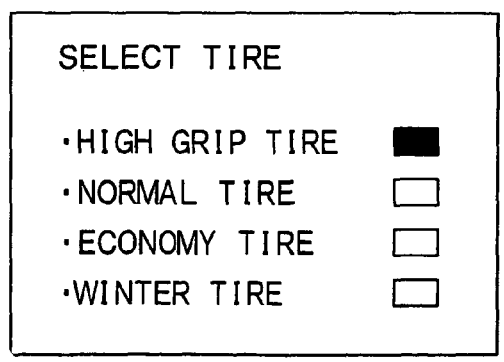
FIG. 2 is a diagram showing an image of a tore selecting screen.

The type of tire mounted on the vehicle is registered in the navigation device 1 when the tire is mounted on the vehicle or when the tire is replaced to a new tire. In this case, the user registers the type of tire according to a setting screen. Specifically, according to the setting screen shown in FIG. 2, the user selects the type of tire mounted on the vehicle among a high grip tire, a normal tire, an economical tire, a winter season tire and the like. The high grip tire has high grip performance. The normal tire has medium grip performance. The economical tire has low grip performance. The winter season tire such as a studless tire is a tire for driving on a snowy road or an icy road. The registered type of tire is stored as tire type information in the flash memory.

When the navigation ECU 16 determines based on the current position and the road data that there is a curve ahead of the vehicle, the ECU 16 determines the tire type based on the tire type information stored in the flash memory. Further, the ECU 16 determines a curvature threshold corresponding to the tire type. When the ECU 16 determines that the curvature of the curve existing ahead of the vehicle is smaller than the curvature threshold, the ECU 16 performs a warning process for informing the driver of the curve warning.

The RON in the ECU 16 stores the curvature threshold data representing the curvature threshold corresponding to the tire type. In the curvature threshold data, the curvature threshold becomes smaller as the grip performance of the tire becomes larger. The ECU 16 specifies the curvature threshold based on the curvature threshold data.

Figure 3A:
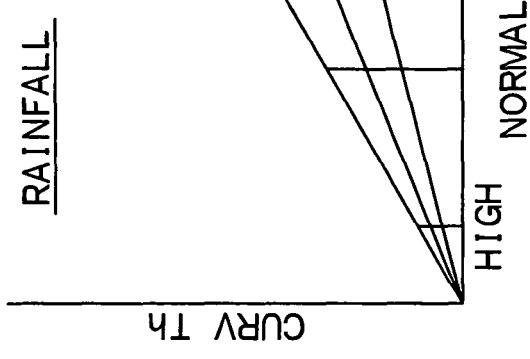
FIG. 3A is a graph showing a relationship between a tire type and a curvature threshold in case of no-rainfall.
Figure 3B:
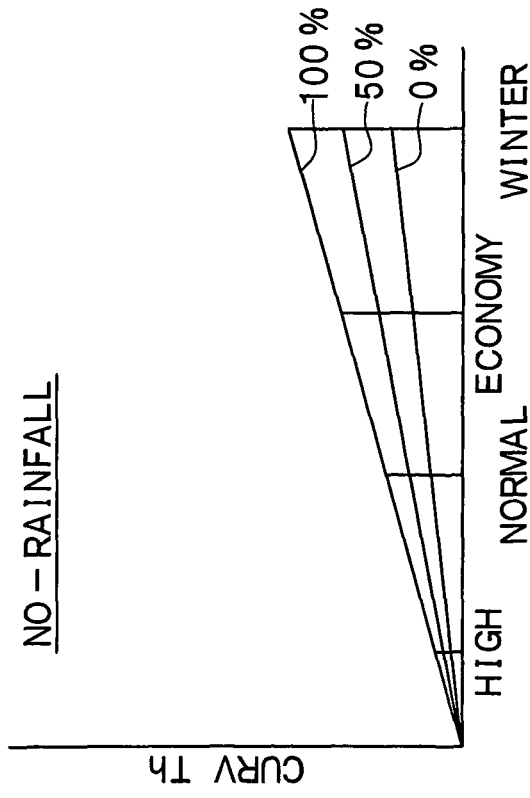
FIG. 3B is a graph showing a relationship between a tire type and a curvature threshold in case of rainfall.

FIGS. 3A and 3B show examples of the curvature threshold data, which represents a relationship between the tire type and the curvature threshold. FIG. 3A shows the curvature threshold data in case of no-rainfall time based on the grip performance of the tire on a road under a dry condition. FIG. 3B shows the curvature threshold data in case of rainfall time based on the grip performance of the tire on a road under a wet condition. Thus, the curvature threshold data in case of no-rainfall time is independently defined from the curvature threshold data in case of rainfall time. Even when the tire type is same, the curvature threshold in case of the wet condition is larger than that in case of the dry condition. In FIGS. 3A and 3B, 0%, 50% and 100% represent the tire wearing degree. Specifically, 0% represents a new tire.

The curvature threshold becomes larger in the order of the high grip tire, the normal tire, the economy tire and the winter tire. Thus, when the grip performance is high, the curvature threshold is small.

Even when the tire type is same, the curvature threshold of the highly worn tire is larger than that of the slightly worn tire. For example, the curvature threshold of the tire having the wearing degree of 100% is larger than that of the tire having the wearing degree of 0%.

Figure 4:
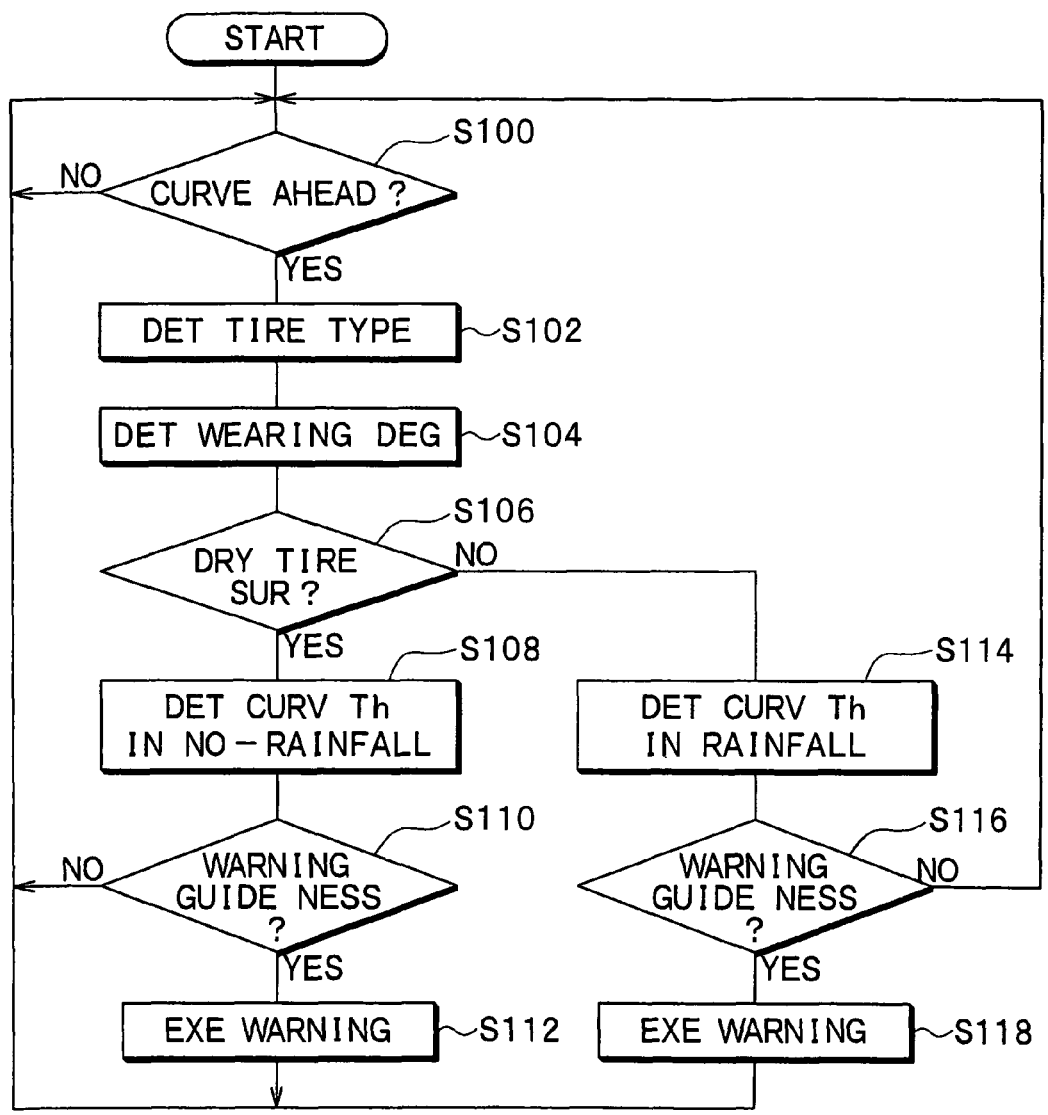
FIG. 4 is a diagram showing a flowchart of a curve warning guidance process in a navigation ECU.

FIG. 4 shows a flowchart of a process for executing curve warning guidance. The navigation device 1 turns on when an ignition switch of the vehicle turns on. Then, the ECU 16 starts to execute the process for curve warning guidance.

In Step S100, the ECU 16 determines whether a curve exists ahead of the current position of the vehicle along with the guiding route. Specifically, based on the current position of the vehicle and the road data, the ECU 16 determines whether the curve exists within a predetermined distance ahead of the vehicle.

When the ECU 16 determines that there is no curve ahead of the vehicle within the predetermined distance, the determination in Step S100 is "NO." In this case, the ECU 16 repeats Step S100. When the ECU 16 determines that the curve exists ahead of the vehicle within the predetermined distance, the determination in Step S100 is "YES." Then, in Step S102, the ECU 16 determines the tire type of the tire mounted on the vehicle. In this embodiment, the ECU 16 specifies the tire type based on the tire type information stored in the flash memory.

In Step S104, the ECU 16 determines the wearing degree of the tire. The wearing degree is input from the tire surface photographing device 13.

In Step S106, the ECU 16 determines whether the tire surface is dried or wet. Specifically, based on the information from the tire surface photographing device 13 the ECU 16 determines whether the surface of the tire is dried.

When there is no rain, and the tire surface is dried, the determination in Step S106 is "YES." Then, in Step S108, the ECU 16 determines the curvature threshold based on the curvature threshold data in case of the no-rainfall time, which is shown in FIG. 3A. Specifically, the ECU 16 references the curvature threshold data in case of no-rainfall, and specifies the curvature threshold corresponding to the tire type and the wearing degree of the tire. For example, when the tire type is the normal tire, and the wearing degree of the tire is 50%, the ECU 16 specifies the curvature threshold with the 50% wearing degree and the normal tire in FIG. 3A.

In Step S110, the ECU 16 determines whether curve warning guidance is necessary based on a determination that the curvature of the curve existing in the road ahead of the vehicle is smaller or not than the curvature threshold specified in Step S108. Here, the curvature of the curve existing in the road ahead of the vehicle is obtained from the map data.

When the curvature of the curve existing in the road ahead of the vehicle is smaller than the curvature threshold specified in Step S108, the determination in Step S110 is "YES." In this case, in Step S112, the curve warning guidance is performed. For example, a message of "Caution! Sharp curve exists ahead" is displayed on the screen of the display 14. Further, a voice message of the same is output from the speaker 15. Then, it returns to Step S100.

The curvature threshold of the vehicle having the tire with high grip performance is smaller than that of the vehicle having the tire with low grip performance. Thus, for example, when the vehicle has the economy tire, the curvature threshold is large, so that the curve warning guidance is performed even when the curvature of the curve is comparatively large, i.e., even when the road gently curves. When the vehicle has the high grip tire, the curve warning guidance is not performed unless the curvature of the curve is comparatively small, i.e., unless the road curves tightly. The curvature threshold of the vehicle having the tire with a large wearing degree is larger than that of the vehicle having the tire with a small wearing degree. Thus, when the vehicle has the tire with the large wearing degree, the curvature threshold is large, so that the curve warning guidance is performed even when the curvature of the curve is comparatively large, i.e., even when the road gently curves. When the vehicle has the tire with the small wearing degree, the curve warning guidance is not performed unless the curvature of the curve is comparatively small, i.e., unless the road curves tightly.

When the curvature of the curve existing in the road ahead of the vehicle is equal to or larger than the curvature threshold specified in Step S108, the determination in Step S110 is "NO." In this case, it returns to Step S100 without performing the curve warning guidance.

When it rains, and the surface of the tire is wet, the determination in Step S106 is "NO." Then, in Step S114, the ECU 16 determines the curvature threshold based on the curvature threshold data in case of the rainfall time, which is shown in FIG. 3B. Specifically, the ECU 16 references the curvature threshold data in case of rainfall, and specifies the curvature threshold corresponding to the tire type and the wearing degree of the tire.

Then, in Step S116, the ECU 16 determines whether curve warning guidance is necessary based on a determination that the curvature of the curve existing in the road ahead of the vehicle is smaller or not than the curvature threshold specified in Step S114.

When the curvature of the curve existing in the road ahead of the vehicle is smaller than the curvature threshold specified in Step S114, the determination in Step S116 is "YES." In this case, in Step S118, the curve warning guidance is performed. Then, it returns to Step S100.

Here, the curvature threshold data in case of rainfall has the curvature threshold larger than that in the curvature threshold data in case of no-rainfall. Thus, the curve warning guidance is performed even when the curvature of the curve is comparatively large, i.e., even when the road gently curves, compared with a case where the surface of the tire is dried.

When the curvature of the curve existing in the road ahead of the vehicle is equal to or larger than the curvature threshold specified in Step S114, the determination in Step S116 is "NO." In this case, it returns to Step S100 without performing the curve warning guidance.

In the above feature, the relationship between the tire type and the curvature threshold is defined in the curvature threshold data such that the curvature threshold becomes small as the grip performance of the tire becomes large. By using this curvature threshold data, the ECU 16 specifies the curvature threshold corresponding to the tire mounted on the vehicle. When the ECU 16 determines that curvature of the curve existing ahead of the vehicle is smaller than the curvature threshold, the vehicle driving support apparatus performs the curve warning guidance for the driver. Thus, the apparatus can perform the warning guidance adapted to the type of the tire mounted on the vehicle.

The curvature threshold data represents a relationship between the type of tire and the curvature threshold such that the curvature threshold of the largely worn tire is larger than that of the slightly worn tire. Thus, the wearing degree of tire mounted on the vehicle is estimated, and the appropriate curvature threshold is specified based on the estimated wearing degree and the curvature threshold data stored in the memory. Thus, the warning guidance corresponding to the wearing degree of tire mounted on the vehicle is performed.

The apparatus determines whether the tire surface is dried or wet. When the apparatus determines that the surface of tire mounted on the vehicle is dried, based on the grip performance of tire in case of the dried road, the curvature threshold data for defining the relationship between the tire type and the curvature threshold in case of no-rainfall is used for specifying the curvature threshold of the vehicle. When the apparatus determines that the surface of tire mounted on the vehicle is wet, based on the grip performance of tire in case of the wet road, the curvature threshold data for defining the relationship between the tire type and the curvature threshold in case of rainfall is used for specifying the curvature threshold of the vehicle. Thus, the warning guidance corresponding to the dry or wet condition of the surface of tire mounted on the vehicle is performed.

In the above embodiment, when the tire of the vehicle is replaced to new one, the user operates to input the tire type information showing the type of tire mounted on the vehicle into the flash memory. Based on the tire type information stored in the flash memory, the tire type is specified. Alternatively, the groove pattern of the tire surface is detected by the tire surface photographing device 13, and, based on the groove pattern, the tire type of tire mounted on the vehicle may be determined.

The tire surface photographing device 13 detects the dry or wet condition of the tire surface based on the color tone of the tire surface of tire mounted on the vehicle. Alternatively, a weather condition such as rain condition may be detected by a water drop sensor. Based on the rain condition around the vehicle, the apparatus may determine whether the tire surface of the vehicle is dried or wet. Alternatively, the weather condition may be estimated according to a signal showing operation of a wiper of the vehicle, and, based on the weather condition, the apparatus may determine whether the tire surface of the vehicle is dried or wet.

In the above embodiment, the wearing degree of the tire surface is detected by the tire surface photographing device 13. Alternatively, without using the tire surface photographing device 13, the wearing degree of the tire surface may be determined based on a driving distance from a time when the tire is replaced to new one.

In the above embodiment, the curvature threshold data in case of no-rainfall and the curvature threshold data in case of rainfall are stored in the memory medium, and the curvature threshold data is selected according to the dry condition of the tire surface. Alternatively, for example, a common curvature threshold data for both cases of no-rainfall and rainfall may be stored in the memory medium, and the curvature threshold may be specified based on the common curvature threshold data regardless of the dry condition of the tire surface.

In the above embodiment, the warning guidance is performed regardless of the air pressure of the tire mounted on the vehicle. Alternatively, for example, the apparatus may further include a tire air pressure monitor for detecting the air pressure of the tire. The apparatus determines whether the air pressure of the time is within a predetermined range. When the air pressure of the tire is not in the predetermined range, the apparatus sets the curvature threshold to be larger than the curvature threshold in a case where the air pressure of the time is within the predetermined range.

Step S102 corresponds to a tire type determination element. The ROM and the flash memory in the ECU 16 correspond to a memory medium. Step S100 corresponds to a curve determination element. Step S108 and Step S114 correspond to a curvature threshold determination element. Step S110 and Step S116 correspond to a warning guidance performing element. Step S104 corresponds to a tire wearing degree estimation element. Step S106 corresponds to a tire surface condition determination element.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A vehicle driving support apparatus comprising:
a tire type determination device for determining a type of a tire mounted on a vehicle;
a memory medium for storing a curvature threshold data, which shows a relationship between the type of the tire and a curvature threshold in such a manner that the curvature threshold becomes smaller as a grip performance of the tire increases;
a curve determination device for determining based on a current position of the vehicle and a road data whether a curve is disposed on a road ahead of the vehicle;
a curvature threshold determination device for specifying the curvature threshold corresponding to the tire mounted on the vehicle based on the type of the tire determined by the tire type determination device and the curvature threshold data stored in the memory medium when the curve determination device determines that the curve is disposed on the road ahead of the vehicle; and
a warning guidance performing device for performing curve warning guidance to a driver when the warning guidance performing device determines that a curvature of the curve ahead of the vehicle is smaller than the curvature threshold specified by the curvature threshold determination device.

2. The vehicle driving support apparatus according to claim 1,
wherein the curvature threshold data further shows the relationship between the type of the tire and the curvature threshold in such a manner that the curvature threshold corresponding to a large wearing degree of tire is larger than the curvature threshold corresponding to a small wearing degree of tire,
the apparatus further comprising:
a tire wearing degree estimation device for estimating a wearing degree of the tire mounted on the vehicle,
wherein the curvature threshold determination device specifies the curvature threshold corresponding to the vehicle based on the wearing degree of the tire estimated by the tire wearing degree estimation device and the curvature threshold data stored in the memory medium.

3. The vehicle driving support apparatus according to claim 2,
wherein the tire wearing degree estimation device includes a camera for photographing a surface of the tire mounted on the vehicle, and
wherein the tire wearing degree estimation device determines the wearing degree of the tire based on a photograph of the surface of the tire.

4. The vehicle driving support apparatus according to claim 1,
wherein the memory medium stores the curvature threshold data for no-rainfall, which defines the relationship between the type of the tire and the curvature threshold based on a grip performance of the tire under a condition where a surface of the road is dried, and the curvature threshold data for rainfall, which defines the relationship between the type of the tire and the curvature threshold based on the grip performance of the tire under a condition where the surface of the road is wet,
the apparatus further comprising:
a tire surface condition determination device for determining whether a surface of the tire mounted on the vehicle is dried or wet,
wherein the curvature threshold determination device specifies the curvature threshold of the vehicle based on the curvature threshold data for no-rainfall when the tire surface condition determination device determines that the surface of the tire mounted on the vehicle is dried, and
wherein the curvature threshold determination device specifies the curvature threshold of the vehicle based on the curvature threshold data for rainfall when the tire surface condition determination device determines that the surface of the tire mounted on the vehicle is wet.

5. The vehicle driving support apparatus according to claim 4,
wherein the tire surface condition determination device includes a camera for photographing a surface of the tire mounted on the vehicle, and
wherein the tire surface condition determination device determines based on a photograph of the surface of the tire whether the surface of the tire mounted on the vehicle is dried or wet.

6. The vehicle driving support apparatus according to claim 1,
wherein the tire type determination device stores information about the type of the tire mounted on the vehicle when an user of the vehicle driving support apparatus preliminary inputs the information about the type of the tire, and
wherein the curve determination device is a vehicle navigation device.

7. The vehicle driving support apparatus according to claim 6,
wherein the curvature threshold determination device and the warning guidance performing device are provided by an electronic control unit of the vehicle navigation device, and
wherein the vehicle navigation device further includes a position detector for detecting the current position of the vehicle and a map data input unit for inputting a map data from another memory medium into the electronic control unit.

8. The vehicle driving support apparatus according to claim 7, further comprising:
a tire surface photographing device for photographing a surface of the tire mounted on the vehicle,
the tire surface photographing device determines a wearing degree of the tire mounted on the vehicle, and further determines whether a surface of the tire mounted on the vehicle is dried or wet,
wherein the curvature threshold data further shows the relationship between the type of the tire and the curvature threshold in such a manner that the curvature threshold is related to a wearing degree of tire, wherein the curvature threshold determination device specifying the curvature threshold corresponding to the tire of the vehicle based on the type of the tire, the wearing degree of the tire and the curvature threshold data, wherein the curvature threshold data includes a no-rainfall curvature threshold data and a rainfall curvature threshold data, wherein the no-rainfall curvature threshold data defines the relationship between the type of the tire and the curvature threshold based on the grip performance of the tire under a condition where a surface of the road is dried, wherein the rainfall curvature threshold data defines the relationship between the type of the tire and the curvature threshold based on the grip performance of the tire under a condition where the surface of the road is wet, wherein the curvature threshold determination device specifies the curvature threshold corresponding to the tire based on the no-rainfall curvature threshold data when the tire surface condition determination device determines that the surface of the tire is dried, and wherein the curvature threshold determination device specifies the curvature threshold corresponding to the tire based on the rainfall curvature threshold data when the tire surface condition determination device determines that the surface of the tire is wet.

* * * * *